United States Patent
Shemano

[11] 3,867,531
[45] Feb. 18, 1975

[54] METHOD OF TREATING CONDITIONS OF DELAYED HYPERSENSITIVITY EMPLOYING MORPHOLINE DERIVATIVES

[75] Inventor: Irving Shemano, Cincinnati, Ohio

[73] Assignee: Richardson-Merrell Inc., New York, N.Y.

[22] Filed: June 15, 1973

[21] Appl. No.: 370,292

[52] U.S. Cl. .............................................. 424/248
[51] Int. Cl. ........................................... A61k 27/00
[58] Field of Search .................................... 424/248

[56] References Cited
UNITED STATES PATENTS
3,576,865 4/1971 Fleming et al. ................. 260/246 B Primary Examiner—Sam Rosen
Attorney, Agent, or Firm—L. Ruth Hattan; George W. Rauchfuss, Jr.; Eugene O. Retter

[57] ABSTRACT

Bis-basic substituted aromatic polycyclic compounds of the following structure are useful in treating conditions of delayed hypersensitivity:

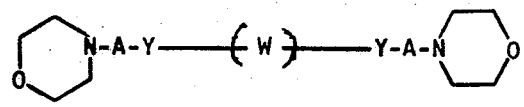

wherein (W) represents an aromatic polycyclic nucleus selected from fluoranthene, fluorene, fluoren-9-ol, fluoren-9-one, dibenzofuran, dibenzothiophene, carbazole, xanthene, xanthone, thioxanthene, phenoxathiin, or anthraquinone; Y represents carbonyloxy, carbonylthio, oxygen, divalent sulfur or carbonyl with the provisos that when Y is carbonyloxy or carbonylthio, (W) is other than thioxanthene, phenoxathiin or anthraquinone, when Y is oxygen or divalent sulfur, (W) is other than thioxanthene or phenoxathiin, and when Y is carbonyl, (W) is other than fluoren-9-ol or anthraquinone; A represents a straight or branched alkylene chain of from one to six carbon atoms with the proviso that when Y is carbonyloxy or carbonylthio, A contains at least two straight chain carbon atoms, that is, an ethylene radical; and pharmaceutically useful acid addition salts.

6 Claims, No Drawings

METHOD OF TREATING CONDITIONS OF DELAYED HYPERSENSITIVITY EMPLOYING MORPHOLINE DERIVATIVES

FIELD OF INVENTION

This invention relates to the use of bis-basic substituted aromatic polycyclic derivatives wherein the basic substituents contain a morpholino radical for treating conditions of delayed hypersensitivity.

DESCRIPTION OF PRIOR ART

The following patents disclose bis-basic substituted aromatic polycyclic derivatives wherein the basic substituents contain a morpholino radical: U.S. Pat. No. 3,707,471 discloses bis-basic ether and thioether derivatives of fluoranthene. U.S. Pat. Nos. 3,592,819 and 3,692,907 disclose bis-basic ether and thioether derivatives of fluorene, fluoren-9-ol and fluoren-9-one. U.S. Pat. No. 3,673,191 discloses bis-basic ether and thioether derivatives of dibenzothiophene; Belgian Pat. No. 776,555 discloses bis-basic ether and thioether derivatives of xanthene and xanthone; Belgian Pat. No. 767,201, which is equivalent to pending U.S. application Ser. No. 37,312, discloses bisbasic ether derivatives of anthraquinone; U.S. Pat. No. 3,531,489 discloses bis-basic ester and thioester derivatives of fluoranthene; U.S. Pat. No. 3,647,860 discloses bis-basic ester derivatives of fluorene; U.S. Pat. No. 3,718,685 discloses bis-basic ester derivatives of fluoren-9-ol; U.S. Pat. No. 3,662,062 discloses bis-basic ester and thioester derivatives of fluoren-9-one; Great Britain Pat. No. 1,262,052, which is equivalent to pending U.S. application Ser. No. 833,717, discloses bis-basic ester derivatives of dibenzofuran; Great Britain Pat. No. 1,304,651 discloses bis-basic ketone derivatives of fluoranthene. Great Britain Pat. No. 1,286,755 discloses bis-basic ketone derivatives of fluorene and fluoren-9-one; Belgian Pat. No. 772,582, which is equivalent to pending U.S. application Ser. No. 72,171, discloses bis-basic ketone derivatives of dibenzofuran; Great Britain Pat. No. 1,292,567 discloses bis-basic ketone derivatives of dibenzothiophene; Great Britain Pat. No. 1,312,534, which is equivalent to pending U.S. application Ser. No. 137,055, discloses bis-basic ketone derivatives of thioxanthene; Belgian Pat. No. 776,535 which is equivalent to pending U.S. application Ser. No. 97,379, discloses bis-basic ketone derivatives of xanthene and xanthone; W. German Pat. No. 2,231,067, which is equivalent to pending U.S. application Ser. No. 158,122, discloses bis-basic ketone derivatives of phenoxathiin. Each of these disclosures describes the compounds therein as being useful as antiviral agents and do not suggest or render obvious the use of the compounds disclosed herein in the treatment of conditions of delayed hypersensitivity.

SUMMARY OF INVENTION

Bis-basic substituted aromatic polycyclic compounds of the following structure are useful in treating conditions of delayed hypersensitivity:

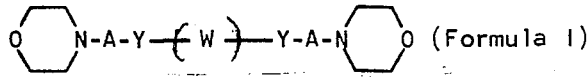
(Formula I)

wherein (W) represents an aromatic polycyclic nucleus selected from fluoranthene, fluorene, fluoren-9-ol, fluoren-9-one, dibenzofuran, dibenzothiophene, carbazole, N-(lower) alkyl carbazole, xanthene, xanthone, thioxanthene, phenoxathiin, or anthraquinone; Y represents carbonyloxy, carbonylthio, oxygen divalent sulfur or carbonyl with the provisos than when Y is carbonyloxy or carbonylthio, (W) is other than thioxanthene, phenoxathiin or anthraquinone; when Y is oxygen or divalent sulfur, (W) is other than thioxanthene or phenoxathiin; and when Y is carbonyl, (W) is other than fluoren-9-ol or anthraquinone; A represents a straight or branched alkylene chain of from one to six carbon atoms with the proviso that when Y is carbonyloxy or carbonylthio, A contains from two to six carbon atoms; and pharmaceutically acceptable acid addition salts thereof.

DETAILED DESCRIPTION OF INVENTION

The compounds of this invention are bis-morpholino alkylene derivatives of fluoranthene, as represented by the following general Formula II, bis-morpholinoalkylene derivatives of fluorene, fluoren-9-ol, fluoren-9-one, dibenzofuran, dibenzothiophene, carbazole, and N-(lower)-alkyl carbazole, as represented by the following respective Formulas III–VII, bis-morpholinoalkylene derivatives of xanthene, xanthone, thioxanthene, phenoxathiin and anthraquinone, as represented by the following respective Formulas VIII–XII.

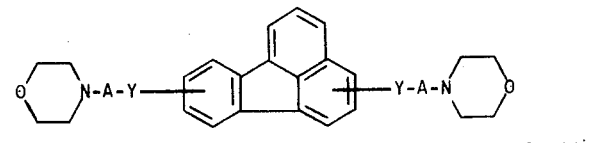

Formula II

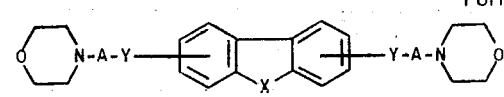

| X | Formula |
|---|---|
| $-CH_2-$ | III |
| $-\underset{OH}{CH}-$ | IV |
| $-\underset{O}{\overset{\parallel}{C}}-$ | V |
| $-O-$ | VI |

| X | Formula |
|---|---|
| $-S-$ | VII |
| $-\underset{R^1}{N}-$ | VII |

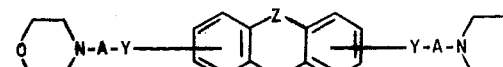

| Z | Z¹ | Formula |
|---|---|---|
| $-CH_2-$ | O | VIII |
| $-\underset{O}{\overset{\parallel}{C}}-$ | O | IX |
| $-CH_2-$ | S | X |
| O | S | XI |
| $-\underset{O}{\overset{\parallel}{C}}-$ | $-\underset{O}{\overset{\parallel}{C}}-$ | XII |

In the above general Formulas II to XII, A represents a straight or branched alkylene chain of from one to six carbon atoms with the proviso that when Y is carbonyloxy or carbonylthio, A contains at least two straight chain carbon atoms, that is, an ethylene group; Y represents carbonyloxy, carbonylthio, oxygen, divalent sulfur, or carbonyl with the following exceptions: in the compounds of general Formula IV, that is, bis-morpholinoalkylene derivatives of fluoren-9-ol, Y is other than carbonyl; in the compounds of general Formulas X and XI, that is, bis-morpholinoalkylene derivatives of thioxanthene and phenoxathiin, Y is other than carbonyloxy, carbonylthio, oxygen or divalent sulfur; in the compounds of general Formula XII, Y is other than carbonyloxy, carbonylthio, or carbonyl; $R^1$ in the compounds of general Formula VII represents hydrogen or a lower alkyl group of from one to four carbon atoms.

In the compounds of general Formula II one of the basic substituents as represented by

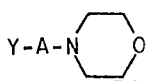

is attached to any one of the carbon atoms of the naphthalene portion of the tetracyclic nucleus, and the other such basic substituent is attached to any one of the carbon atoms of the benzenoid ring of the tetracyclic nucleus. In the compounds of general Formulas III to XII one of the basic substituents is attached to any one of the carbon atoms of one benzenoid ring of the tricyclic nucleus and the other basic substituent is likewise attached to the other such benzenoid ring.

Lower alkyl groups which $R^1$ may represent in the compounds of general Formula VII are methyl, ethyl, n-propyl and n-butyl.

Illustrative examples of compounds of this invention are 2,7-bis(3-morpholinopropyl)fluoren-9-one 2,7-dicarboxylate, 2,7-bis(4-morpholinobutyl(fluoren-9-one-2,5-dicarboxylate, 2,7-bis(2-morpholinoethyl(fluoren-9-one-2,7-dicarbothiolate, 2,7-bis(2-morpholinoethoxy(fluoren-9-one, 2,7-bis(3-morpholinopropylthio)fluoren-9-one, 2,7-bis(5-morpholinovaleryl)fluoren-9-one, 2,5-bis(3-morpholinopropyl)fluoren-9-one, bis (6-morpholinohexyl)fluorene-2,7-dicarboxylate, bis (3-morpholinopropyl)fluorene-2,7-dicarbothiolate, 2,7-bis(4-morpholinobutoxy)fluorene, 2,5-bis(3-morpholinopropoxy)fluorene, 1,7-bis(2-morpholinoethylthio)fluorene, 2,7-bis(3-morpholinopropionyl)fluorene, 3,6-(3-morpholinobutyryl)fluorene, bis(2-morpholinoethyl)-fluoren-9-ol-2,7-dicarboxylate, 2,7-bis(5-morpholinopentoxy)fluoren-9-ol, bis(4-morpholinobutyl)dibenzofuran-2,6-dicarboxylate, bis-(3-morpholinopropyl)dibenzofuran-2,8 -dicarbothiolate, 2,6-bis(3-morpholinobutoxy)dibenzofuran, 2,8-bis(4-morpholinobutyryl)dibenzofuran, 2,8-bis(4-morpholinobutyryl)dibenzothiophene, 2,6-bis(4-morpholinobutoxy)dibenzothiophene, bis(3-morpholinopropyl)-dibenzothiophene-2,8-dicarboxylate, 3,6-bis(4-morpholinobutyryl)-N-methylcarbazole, 2,8-bis(2-morpholinoethoxy)-N-ethylcarbazole, 3,6-bis(2-morpholinoacetyl)carbazole, bis(4-morpholinobutyl)carbazole-3,6-dicarboxylate, bis-(morpholinopentyl)xanthene-3,6-dicarboxylate, 2,7-bis-(2-morpholinoethoxy)xanthene, 2,7-bis(4-morpholinobutyryl)-xanthen-9-one, 3,6-bis(3-morpholinopropylthio)xanthen-9-one, bis(3-morpholinoisobutyl)xanthen-9-one-3,6-dicarboxylate, 2,8-bis(4-morpholinobutyryl)thioxanthene, 2,8-bis-(2-morpholinoacetyl)thioxanthene, 2,8-bis(3-morpholinopropoxy)anthraquinone, 2,6-bis(2-morpholinoethoxy)anthraquinone, 2,7-bis(4-morpholinobutyryl)phenoxathiin, 2,8-bis-(3-morpholinopropionyl)phenoxathiin, bis(4-morpholinobutyl)fluroanthene-3,9-dicarboxylate, 4,8-bis(3-morpholinopropoxy)fluoranthene, 3,9-(4-morpholinobutoxy)fluoranthene, 3,9-bis(4-morpholinobutyryl)fluoranthene, 3,9-bis(5-morpholinopentylthio)fluoranthene.

Pharmaceutically acceptable acid addition salts of the base compounds of this invention are those of any suitable inorganic or organic acid. Illustrative suitable inorganic acids are hydrochloric, hydrobromic, sulfuric, and phosphoric acids. Illustrative suitable organic acids are lower aliphatic hydrocarbon monocarboxylic acids, such as, glycolic or lactic acid; lower aliphatic lower alkoxy-hydrocarbon monocarboxylic acids, such as, methoxyacetic or ethoxyacetic acids; lower aliphatic lower alkanoyl-hydrocarbon monocarboxylic acids, such as, pyruvic acid; lower aliphatic hydrocarbon dicarboxylic acids, such as malonic, succinic, methylsuccinic, glutaric, α-methylglutaric, β-methylglutaric, itaconic, maleic, citraconic, homocitraconic, or fumaric acid; lower aliphatic hydroxy hydrocarbon dicarboxylic acids, such as, malic or tartaric acid; loewr aliphatic lower alkoxy-hydrocarbon dicarboxylic acids, such as, αβ-dimethoxysuccinic or ethoxymaleic acid; lower aliphatic hydrocarbon tricarboxylic acids, such as, aconitic or tricarballylic acid; lower aliphatic hydroxyhydrocarbon tricarboxylic acids, such as citric acid Additionally organic sulfonic acids, such as lower alkane sulfonic acids, for example, methanesulfonic or ethanesulfonic acid, or lower hydroxy-alkane sulfonic acids, for example, 2-hydroxyethane sulfonic acid are suitable. Particularly useful are pharmacologically acceptable acid addition salts with mineral acids, such as hydrochloric acid. Mono- or di-acid salts may be formed, and the salts may be hydrated, for example, monohydrate, or substantially anhydrous.

Introduction of an antigen, or a foreign substance, into an organism results in a specific immunological response changing the reactivity of the organism towards the antigen and substances closely resembling the antigen. This response is usually a heightened reactivity or increased resistance to the antigen. This heightened reactivity is due in part to the production of antibodies which can result in an immediate hypersensitivity and in part to a cell-mediated immunity which can result in delayed hypersensitivity. Cell-mediated immunity is dependent upon the presence of cells sensitized to antigen, primarily thymus-modified lymphocytes, which specifically interact with the antigen. Macrophages are also involved in the processing of antigen and in the effector mechanisms leading to delayed hypersensitivity.

The type of substances which elicit delayed hypersensitivity are many and various. They may be organic chemicals, including drugs, simple chemical derivatives, or protein-containing antigens of microorganisms, such as, bacteria, viruses, fungi or protozoa, or tissue antigens. Conditions of delayed hypersensitivity are associated with numerous pathological disorders, for example, contact hypersensitivity in the skin, rejection of tissue grafts or transplants, autoimmune diseases and certain infectious diseases. Such pathological disorders often involve, in addition to the cell-mediated delayed hypersensitivity responses, humoral antibody responses involving the production of antigen-specific antibodies. Generally, treatment of these disorders has been with immunosuppressive agents, such as, purine analogs, folic acid antagonists, alkylating agents and corticosteroids. Such agents have been found to be non-specific in their immunosuppressant effects, that is, they suppress both the humoral antibody and delayed (cell-mediated) hypersensitivity responses. [Drug Therapy 1, no. 4, pp 3–16 (1971)]. The compounds disclosed herein are unique in that they suppress only the delayed hypersensitivity response without concurrent suppression of the humoral immune response.

The compounds disclosed herein suppress delayed hypersensitivity responses thereby rendering the compounds useful in patients in the treatment of conditions of delayed hypersensitivity resulting from infectious diseases, specifically tuberculosis, streptococcus, staphylococcus and pneumoccocus diseases, typhoid fever, undulant fever, chancroid, whooping-cough and leprosy; toxoids and vaccines, particularly diphtheria toxoid and smallpox vaccination; contact hypersensitivity in the skin, specifically from nickel salts, primrose or poison ivy, poison oak and paraphenylene diamine; rejection of tissue grafts and transplants; and autoimmune diseases, specifically rheumatoid arthritis, systemic lupus erythematosus, glomerular nephritis, rheumatic fever, ulcerative colitis, diabetes mellitus, pernicious anemia, coeliac disease, primary atypical pneumonia, Hashimoto's thyroiditis, multiple sclerosis, peripherial neurotis, pemphigus, Addison's disease and Grave's disease.

The utility of the compounds disclosed herein in the treatment of conditions of delayed hypersensitivity is manifested by the ability of the compounds to suppress delayed hypersensitivity reactions in vitro in the macrophage migration inhibition test (MMIT) and in vivo in the experimental allergic encephalomyelitis (EAE) test, which are well recognized tests for detecting agents or compounds effective in treating conditions of delayed hypersensitivity. *Immunology for Students of Medicine*, 3rd edition, 1970, F.A. Davis Company, pp. 498–500; Federation Proceedings 27, No. 1, pp. 3–15, (1968); Advances in Immunology 5, pp. 131–208 (1966).

As used herein, the term patient means warm blooded animals, particularly mammals and humans. The compounds disclosed herein may be administered to a patient orally, parenterally, or topically either alone or in the form of pharmaceutical preparations. Pharmaceutical preparations containing conventional pharmaceutical carriers and as active ingredients compounds of this invention can be employed in unit dosage forms such as solids, for example, tablets, capsules and pills, or liquid solutions, suspensions, or emulsions for oral and parenteral administration. The quantity of compound administered can vary over a wide range to provide from about 0.1 mg/kg (milligrams per kilogram) to about 200 mg/kg of body weight of the patient per day, and preferably from about 1 mg/kg to 100 mg/kg of body weight of the patient per day, to achieve the desired effect. Unit doses can contain from about 5 mg to 1.0 g of a compound of this invention and may be administered, for example, from 1 to 4 times daily.

The compounds of this invention can be prepared by several methods. The bis-morpholinoalkylene esters and thioesters, that is, compounds of general Formula I wherein Y represents carbonyloxy or carbonylthio can be prepared by the reaction of a compound of the formula

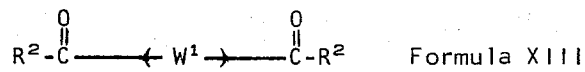  Formula XIII wherein $R^2$ is OH, halogen, such as, chlorine or bromine, or lower alkoxy, such as, methoxy or ethoxy and ($W^1$) represents fluoranthene, fluorene, fluoren-9-one, dibenzofuran, dibenzothiophene, carbazole, N-(lower)alkyl carbazole, xanthene or xanthone; with a morpholinoalkanol or morpholinoalkylthiol of the formula

  Formula XIV wherein $A^1$ is a straight or branched alkylene chain of from two to six carbon atoms; and $R^3$ is oxygen or sulfur. The esterification can be achieved by allowing the compound of Formula XIII wherein $R^2$ is hydroxy, to react with the appropriate morpholinoalkanol or morpholinoalkylthiol in an inert solvent in the presence of a catalyst and employing general methods for removing water from the reaction site. Preferred solvents are chloroform, isopropyl alcohol, dioxane, and toluene. The reaction may be catalyzed by the use of mineral acids including hydrochloric, sulfuric or certain organic acids such as p-toluene-sulfonic acid. Methods whereby water can be removed from the reaction include the use of water scavengers such as the carbodiimides or by the azeotropic removal of water. The reaction will proceed at temperatures ranging from 50°–150°C over a period of 6 to 72 hours depending upon the solvent and catalyst.

Preferably, the esterification can be achieved by allowing the acid halide, where $R^2$ in the above Formula XIII is halogen, to react with the appropriate morpholinoalkanol or morpholinoalkylthiol. The esters and thioesters of this invention can be produced in a variety of inert solvents over a wide range of temperatures and reaction time. The solvents of choice include chloroform, dioxane, tetrahydrofuran, and the aromatic solvents such as benzene and toluene. In chloroform, the reaction is generally complete within one hour at the reflux temperature of the solvent, although the reaction time can range from 15 minutes to 3 days.

The bis-basic ester and thioester derivatives of general Formula I may also be prepared by a transesterification reaction in which a (lower) alkoxy ester, that is, a compound of Formula XIII wherein $R^2$ is, for example, methoxy or ethoxy, is reacted with the appropriate morpholinoalkanol or morpholinoalkylthiol under suitable conditions. This type of reaction is catalyzed by alkaline or acid catalysts and is reversible. The basic esters may be obtained by causing the equilibrium to be shifted by removing the morpholinoalkanol or morpholinoalkylthiol component or by employing a large excess of the morpholinoalkanol or morpholinoalkylthiol. Preferably, the reaction is carried out by removing the alkanol or alkylthiol component with the use of an alkaline catalyst. The alkanol or alkylthiol component may be removed by direct distillation or distillation with a suitable solvent. Suitable alkaline catalysts are alkali metals, such as, sodium methoxide or sodium ethoxide; or alkali amides such as lithium or sodium amide. Suitable solvents are those forming an azeotropic distillation mixture with the alkanol or alkylthiol component, for example, benzene or toluene, or a solvent which boils sufficiently higher than the alkanol or alkylthiol to permit its removal by distillation at a temperature below that of the boiling range of the solvent.

The bis-morpholinoester and thioester derivatives of general Formula I wherein (W) represents fluoren-9-ol or fluorene may be prepared by the reduction of the corresponding fluoren-9-one compound. The reduction of the fluoren-9-one derivatives can be carried out either chemically or by hydrogenation in the presence of a catalyst.

Hydrogenation of the fluorenone bis esters takes place in a stepwise fashion. Thus, at room temperature and at low pressure, one equivalent of hydrogen is rapidly absorbed to give the fluorenol derivative. Subsequent uptake of hydrogen is much slower so that if the fluorene derivative is desired, the reaction mixture should be heated to shorten the reaction periods. The hydrogenation can be carried out in any of a variety of solvents such as water, alcohols such as ethanol or methanol, dimethylformamide, or mixtures of these solvents. The fluorenone compound is hydrogenated in the acid addition salt form. Hydrogenation catalysts, such as palladium or platinum, supported or unsupported, may be used in this hydrogenation.

The fluorenol compounds of this invention may be prepared by the chemical reduction of the corresponding base form of the fluorenone derivatives such as with sodium borohydride, lithium borohydride, and the like, at 0°–100°C. for 10 minutes to 4 hours in a suitable solvent such as water, ethanol, and the like. The fluorenone bis-basic esters and thioesters may be added to the borohydride reagent, either as the base dissolved in an organic solvent such as alcohols, or as the salt in an aqueous or aqueous-alcoholic solution. In the latter case, an excess of borohydride reagent should be used to compensate for reagent consumed by neutralization of the salt.

Additional methods for the preparation of bis-basic ester and/or thioester derivatives of general Formula I of fluoranthene, fluorene, fluoren-9-ol, and fluoren-9-one are set forth respectively in U.S. Pat. Nos. 3,531,489, 3,647,860, 3,718,685 and 3,662,062, and the appropriate portions of each patent are incorporated hereby by reference thereto.

The compounds of general Formula I wherein Y is oxygen or divalent sulfur, that is, bis-morpholinoalkylene ether and thioether derivatives may be prepared by the reaction of one equivalent of a diol or dithiol derivative of the formula

HR$^4$+ W$^2$ +R$^4$H

Formula XV wherein R$^4$ represents oxygen or divalent sulfur; and (W$^2$) represents fluoranthene, fluorene, fluoren-9-ol, fluoren-9-one, dibenzofuran, dibenzothiophene, carbazole, N-(lower)-alkyl carbazole, xanthene, xanthone, or anthraquinone; with two equivalents of a morpholinoalkylhalide of the formula

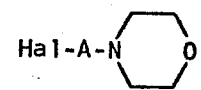
Formula XVI wherein Hal represents chlorine, bromine or iodine; A is a straight or branched alkylene chain of from one to six carbon atoms; in the presence of a base. Typical morpholinoalkyl halides are, for example, 2-morpholinoethylchloride, 3-morpholinopropylbromide, 3-morpholinoisobutylchloride, and 3-morpholinopropylchloride.

Alternatively, the bis-morpholinoalkylene ether and thioether derivatives of general Formula I may be prepared by the reaction of a bis-ω-haloalkylether or thioether derivative of the formula Hal-A-R$^4$+ W$^2$ +R$^4$-A-Hal Formula XVII wherein Hal, A, R$^4$ and (W$^2$) have the meanings defined hereinabove with morpholine. The bis-ω-haloalkyl ether and thioether derivatives of Formula XVII are obtained by the reaction of a diol or dithiol derivative of (W$^2$) with a haloalkylhalo, that is, Hal-A-Hal wherein Hal and A have the meanings defined hereinabove, in the presence of a base.

Suitable bases for the above described reaction are sodium methoxide, sodium hydride, sodium amide, sodium hydroxide, and potassium hydroxide. Suitable solvents include aromatic hydrocarbons, such as benzene, toluene and xylene; halogenated aromatics, such as, chlorobenzene; aprotic solvents, such as N,N-dimethylformamide, N,N-dimethylacetamide, and dimethylsulfoxide; alcohols, such as, ethanol or isopropyl alcohol; ketones, such as acetone, ethers, such as, tetrahydrofuran or dioxane; water; or mixtures of these solvents.

When either sodium methoxide, sodium amide or sodium hydride, for example, is used as the base, the reaction is carried out in an anhydrous medium, such as anhydrous toluene or chlorobenzene. About 2.5 equivalents of the base is added to a suspension of a diol or dithiol derivative of Formula XV, in the anhydrous solvent, and the mixture is heated. In the case where sodium methoxide is used, the methanol formed may be removed advantageously by azeotropic distillation. About 2.5 equivalents of the halide, either a morpholinoalkylhalide or a haloalkylhalo derivative is added, and the mixture heated to reflux for a period which may vary from about 4 to 24 hours. The products are isolated by customary procedures.

In the method where an alkali hydroxide, such as potassium hydroxide is used as the base, two different procedures may be used. In the one procedure a 25 to 50 per cent aqueous solution of the alkali hydroxide (about 2.5 equivalents) is added to a suspension of a diol or dithiol derivative of Formula XV in a suitable aromatic solvent, for example, xylene. This mixture is then heated to boiling, stirring being optional, and the water removed by azeotropic distillation. The reaction mixture, now being essentially anhydrous, is treated with about 2.5 equivalents of either a morpholinoalkylhalide or a haloalkylhalo derivative. In the other procedure the reaction is carried out in a heterogenous medium of water and an aromatic hydrocarbon, such as, toluene or xylene. For example, one equivalent of a diol or dithiol derivative of Formula XV is suspended in the aromatic hydrocarbon. To this suspension is added about 2.5 equivalents of a hydrohalide salt of a morpholinoalkylhalide derivative or a haloalkylhalo derivative after which a minimum volume of water after which a 25 to 50 percent solution of the alkali hydroxide (about 5 equivalents when using a morpholinoalkylhalide derivative and about 2 equivalents when using a haloalkylhalo derivative) is added with efficient stirring. This mixture is heated to reflux for about 6 to 24 hours, and the product is isolated from the hydrocarbon layer.

The reaction between the bis-ω-haloalkylether or thioether derivative of Formula XVII and morpholine may be carried out under a variety of conditions. For example, the compound of Formula XVII may be heated together with a large excess of morpholine, the excess morpholine serving as both the reaction medium and the hydrohalide acceptor. Or, 1 equivalent of the bis(ω-haloalkyl)ether or thioether, and 4 equivalents of morpholine may be heated together in one of a number of different types of solvents, for example, in aromatic solvents, such as, benzene, toluene, xylene, or chlorobenzene; or lower molecular weight alcohols, such as methanol, ethanol or isopropyl alcohol; or lower molecular weight ketones, such as, acetone or methyl ethyl ketone. The reaction between the halo compound and morpholine is usually promoted by the addition of either sodium or potassium iodide, the iodide being used in either catalytic or stoichiometric amounts. In some cases, it may be advantageous to use only two equivalents of morpholine for each equivalent of the bis-ω-haloalkylether or thioether, an excess of either powdered potassium carbonate or sodium carbonate being used as the hydrohalide acceptor.

Additional methods for the preparation of bis-morpholinoalkylene ether and thioether derivatives of fluoranthene are set forth in U.S. Pat. No. 3,707,471; of fluorene, fluoren-9-ol, and fluoren-9-one are set forth in U.S. Pat. Nos. 3,592,819 and 3,692,907; of dibenzothiophene are set forth in U.S. Pat. No. 3,673,191; of xanthene and xanthone are set forth in Belgian Pat. No. 776,555; of 2,6- and 2,7-bis-morpholinealkylene ether anthraquinone derivatives are set forth in Belgian Pat. No. 767,201; and the appropriate portions of each disclosure are incorporated herein by reference thereto. The additional methods set forth in these disclosures may be appropriately applied to the preparation of bis-morpholinoalkylene ether and thioether derivatives of dibenzofuran, carbazole and anthraquinone.

The compounds of general Formula I wherein Y is carbonyl, and (W) represents fluoranthene, fluorene, dibenzofuran, dibenzothiophene, carbazole, N-(lower)alkyl carbazole, xanthene, thioxanthene, or phenoxathiin, may be prepared by an amination reaction of a bis-ω-haloalkanoyl derivative of the formula

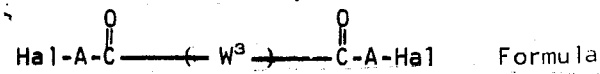

Formula XVIII wherein Hal is chlorine, bromine or iodine; A is a straight or branched alkylene chain of from one to six carbon atoms; and (W³) represents fluoranthene, fluorene, dibenzofuran, dibenzothiophene, carbazole, N-(lower)alkyl carbazole, xanthene, thioxanthene or phenoxathiin; with morpholine.

The amination reaction may be carried out under a variety of conditions. For example, a compound of Formula XVIII may be heated together with a large excess of morpholine, the excess morpholine serving as the reaction medium and the hydrohalide acceptor. Or, one equivalent of a compound of Formula XVIII and four equivalents of morpholine may be heated together in one of a number of different types of solvents, for example, in aromatic solvents, such as, benzene, toluene, or xylene; ethers, such as, tetrahydrofuran, or dioxane; ketones, such as, acetone or butanone; aprotic solvents, such as, N,N-dimethyl-formamide, N,N-dimethylacetamide, or dimethyl sulfoxide; or mixtures of these solvents with water. The reaction between a compound of Formula XVIII wherein Hal is Cl and morpholine is frequently promoted by the addition of either sodium iodide or potassium iodide, the iodide being used in either catalytic or stoichiometric amounts. In some cases, it may be advantageous to use only two equivalents of morpholine for each equivalent of the bis-ω-haloalkanoyl derivative, an excess of an inorganic base, such as, powdered sodium carbonate or potassium carbonate being used as the hydrohalide acceptor. The reaction will proceed normally in 12 hours to two weeks at temperatures of from −30° to 150°C.

Alternatively, the amination reaction may be carried out on a derivative of a compound of Formula XVIII, such as, the bis-ketalderivatave bis-ketal derivative may be prepared by allowing the bis-ω-haloalkanoyl derivative and an excess of ethyl orthoformate to react in the presence of an acid catalyst such as hydrochloric acid for several days in a polar solvent such as ethanol or tetrahydrofuran.

The bis-ω-haloalkanoyl derivatives of Formula XVIII can be prepared by a Friedel-Crafts acylation reaction of an appropriate aromatic polycyclic compound as represented by (W³). Suitable acylating agents which may be used are, for example, chloroacetyl chloride, bromoacetyl bromide, 3-chloropropionyl chloride, 4-chlorobutyryl chloride, 5-chloro-4-methylvaleryl chloride and 4-chloro-3-ethyl-butyryl chloride.

The acylation reaction may be carried out in a variety of solvents and under catalysis of a variety of Lewis acids. The temperature and duration of the reaction may be varied to allow for optimum reaction conditions. A preferred procedure is to combine one equivalent of an appropriate aromatic polycyclic compound as represented by (W³) with 2.5 equivalents of an acylating agent in methylene chloride followed by portionwise addition of aluminum chloride. The temperature of the reaction is maintained below zero degrees with continuous stirring. After the additions are complete the temperature may be elevated to 25°–40°C for 12 to 36 hours. The reaction mixture is worked up in the usual manner by decomposing the complex with ice water/HCl. The product obtained is recrystallized from methylene chloride, chloroform, or the like. The procedure may be varied such that there is a reverse addition of acylating agent and Lewis acid, or a reverse addition of aromatic polycyclic compound and Lewis acid. The more reactive halogen derivative, that is, the bis-ω-iodoalkanoyl derivative, may be prepared from the corresponding bis-chloro derivative using a halogen exchange reaction under the conditions generally employed in the Conant-Finkelstein reaction.

The acylation reaction described above results in bis-ω-haloalkanoyl derivatives of formula XVIII wherein the position of substitution on the various aromatiic polycyclic compounds is the following: 3,9-bis-ω-haloalkanoyl-fluoranthene; 2,7-bis-ω-haloalkanoylfluorene; 2,6- and 2,8-bis-ω-haloalkanoyl-dibenzofuran; 2,6- and 2,8-bis-ω-haloalkanoyldibenzothiophene; 3,6-bis-ω-haloalkanoylcarbazole; 2,7-bis-ω-haloalkanoylxanthene; 2,7-bis-ω-haloalkanoylthioxanthene; and 2,7and 2,8-bis-ω-haloalkanoylphenoxathiin.

The morpholinoalkanoyl derivatives of general Formula I wherein (W) represents fluoranthene, fluorene, dibenzofuran, dibenzothiophene, carbazole, or N-(lower)alkylcarbazole and A is an alkylene chain of from three to six carbon atoms may be prepared by the reaction of a dinitrile derivative of the formula

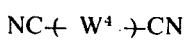

Formula XIX wherein (W⁴) represents fluoranthene, fluorene, dibenzofuran, dibenzothiophene, carbazole or N-(lower)alkylcarbazole with Grignard reagent of the formula

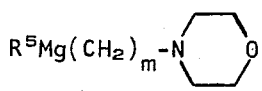

Formula XX wherein $R^5$ is bromine or chlorine; and $m$ is an integer of from 3 to 6. The reaction will proceed in from 1 to 24 hours at a temperature ranging from room temperature to about 80°C. The Grignard reagent may be prepared by reacting magnesium and morpholinoalkyl $C_{3-6}$-halide wherein the halide is bromine or chlorine; a preferred solvent for this reaction is tetrahydrofuran. The dinitrile derivatives of Formula XIX may be prepared from known diamines by a Sandmeyer reaction on the tetrazonium salts of from known dicarboxylic acid derivatives by dehydration of the corresponding amides by standard procedures.

The bis-morpholinoalkanoyl of general Formula I wherein (W) is xanthene, thioxanthene or phenoxathiin, and wherein A is an alkylene chain of from three to six carbon atoms may be prepared by the reaction of a Grignard reagent of the above Formula XX with a bis-amide derivative of the formula

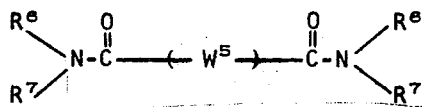

Formula XXI wherein (W⁵) represents xanthene, thioxanthene or phenoxathiin and $R^6$ and $R^7$ represent hydrogen or lower alkyl, or $NR^6R^7$ together form a saturated monocyclic heterocyclic group, such as, pyrrolidino or piperidino. The addition of the Grignard reagent is carried out at low temperatures ranging from −70°C to 0°C, and the reaction mixture is then warmed to 0° to 80°C for 1 to 24 hours. The bis-amide derivatives may be prepared by generally known procedures from the corresponding bis-acids.

The bis-morpholinopropionyl derivatives of general Formula I wherein (W) represents fluoranthene, fluorene, dibenzofuran, dibenzothiophene, xanthene, thioxanthene or phenoxathiin may be prepared by a Mannich reaction of a bis-acetyl derivative of the formula

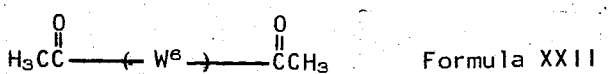

Formula XXII wherein (W⁶) represents fluoranthene, fluorene, dibenzofuran, dibenzothiophene, xanthene, thioxanthene or phenoxathiin with morpholine in the presence of formaldehyde. By combining one equivalent of a compound of Formula XXII and two or more equivalents morpholine with three or more equivalents of formaldehyde the reaction will proceed in from a few minutes to 24 hours in solvents such as water, acetic acid, ethanol, butanol, dioxane, and tetrahydrofuran and at temperatures equivalent to the reflux temperature of the solvent. In this reaction either of two sources of formaldehyde may be employed. When formalin is used the reaction may be conducted with a suspension of a compound of Formula XXII or a co-solvent such as methanol may be added to allow the reaction to proceed in a homogeneous medium. When the source of formaldehyde is paraformaldehyde the reaction is carried out in an organic solvent such as those mentioned above. It is sometimes desirable to add a slight excess of hydrochloric acid to promote depolymerization of paraformaldehyde either during the reaction or at the end of the reaction.

The morpholine employed in this reaction may be added to the reaction medium as the hydrochloride salt or as the base form with subsequent in situ formation of the hydrochloride salt by the addition of hydrochloric acid.

The bis-acetyl derivatives of Formula XXII may be prepared by a Friedel-Crafts acylation reaction on fluoranthene, fluorene, dibenzofuran, dibenzothiophene, xanthene, thioxanthene, or phenoxathiin, or by a reaction of a bis-acid chloride derivative of the same aromatic polycyclic compounds with dimethyl-cadmium, which can be prepared from methyl Grignard and cadmium chloride. The bis-acid chlorides can be prepared by conventional procedures.

The bis-morpholinoalkanoyl derivatives of fluoren-9-one and xanthone, that is, compounds of general Formula I wherein Y is carbonyl and (W) represents fluoren-9-one or xanthone can be prepared by oxidation of the corresponding fluorene or xanthene bis-morpholinoalkanoyl derivatives, the preparations of which are described hereinabove. This oxidation reaction may be carried out using dichromate as the oxidizing agent. The reaction will proceed in from 15 minutes to 6 hours at a temperature of from 80°C to 120°C. The amount of oxidizing agent is limited to the stoichiometric quantity required for oxidation of the 9-methylene group of the fluorene or xanthene derivative. Suitable solvents for this conversion are, for example, water, acetic acid and tert-butyl alcohol, or combinations of these solvents. For example, by combining three moles of a bis-morpholinoalkanoyl fluorene or xanthene derivative of general formula I, wherein Y is carbonyl, and (W) is fluorene or xanthene, dissolved in acetic acid with four moles of sodium dichromate and refluxing the mixture for 1 to 3 hours, the corresponding fluoren-9-one and xanthone derivatives are obtained.

EXAMPLE 1

Bis(3-morpholinopropyl)fluoranthene-3,8-dicarboxylate dihydrochloride.

To 400 ml of chloroform is added 15.0 g (0.046 mole) of fluoranthene-3,8-dicarbonyl chloride, prepared from thionyl chloride and fluoranthene-3,8-dicarboxylic acid according to the procedure of Campbell, J. Chem. Soc., 2748 (1950), and 13.5 g (0.093 mole) of 3-morpholinopropanol. The mixture is heated to reflux for 3 hours. Upon cooling, the precipitated product is collected and recrystallized from methanol-ethyl acetate to give bis(3-morpholinopropyl)fluoranthene-3,8-dicarboxylate dihydrochloride.

EXAMPLE 2

Bis(3-morpholinoethyl)fluoranthene-3,9-dicarboxylate dihydrochloride

To 500 ml of chloroform is added 9.8 g (0.03 mole) of fluoranthene-3,9-dicarbonyl chloride, prepared from thionyl chloride and fluoranthene-3,9-dicarboxylic acid according to the procedure of Campbell, J. Chem. Soc., 1404 (1951), and 7.86 g (0.06 mole) of 2-piperidinoethanol. The reaction mixture is refluxed for 3 hours. Upon cooling, the precipitate is collected, washed with ether and dried to give bis(3-morpholinoethyl)fluoranthene-3,9-dicarboxylate dihydrochloride.

EXAMPLE 3

Bis(3-morpholinopropyl)fluoranthene-3,9-dicarbothiolate dihydrochloride

Following the procedure of Example 2, only substituting 3-morpholinopropanethiol for 2-morpholinoethanol, bis(3-morpholinopropyl)fluoranthene-3,9-dicarbothiolate dihydrochloride is obtained.

EXAMPLE 4

Bis(2-morpholinoethyl)-9-oxofluorene-2,7-dicarboxylate dihydrochloride

A suspension of 30.5 g (0.10 mole) of 9-oxofluorene-2,7-dicarbonyl chloride in 1 liter of dry chloroform (ethanol free) is stirred and treated all at once with 29.0 g (0.20 mole) of dry 3-morpholino-1-propanol causing a mildly exothermic reaction. The resulting mixture is stirred and refluxed for two hours, cooled to room temperature, filtered and the filtrate washed with saturated sodium bicarbonate solution. The chloroform solution is then washed with water and saturated sodium chloride solution, dried over anhydrous sodium sulfate and filtered. Most of the solvent is removed from the filtrate on the steam bath under vacuum, and the residue is dissolved in butanone. This solution is made acidic to Congo Red with etheral HCl. The resulting precipitate is collected, recrystallized from butanone-methanol and dried to give bis(2-morpholinoethyl)-9-oxofluoren-2,7-dicarboxylate hemihydrate, M.P. 247°–8°C (dec.)

EXAMPLE 5

9-Oxofluorene-2,5-dicarboxylate acid

To a stirred suspension of 47.5 g (0.354 mole) of anhydrous aluminum chloride and 25.0 g (0.118 mole) of fluorene-4-carboxylic acid in 700 ml of carbon disulfide chilled to 0° is slowly added 45.0 g (0.354 mole) of oxalyl chloride in 200 ml of carbon disulfide. After 6 hours at 0°, an additional 16 g (0.118 mole) of anhydrous aluminum chloride and 45.0 g (0.354 mole) of oxalyl chloride is added, and the reaction mixture is allowed to stir for 64 hours at room temperature. After the removal work-up of Friedel-Crafts reactions, there is obtained 25 g of fluorene-2,5-dicarboxylic acid which is converted to 9-oxofluorene-2,5-dicarboxylic acid by permanganate oxidation. The product decomposes at 330°–335° and is further characterized as its dimethyl ester, M.P. 180°–181°.

EXAMPLE 6

Bis(2-morpholinoethyl)-9-oxofluorene-2,5-dicarboxylate dihydrochloride

When in the procedure of Example 4, 9-oxofluorene-2,5-dicarbonyl chloride, prepared by standard procedures from the acid of Example 5, is substituted for 9-oxofluorene-2,7-dicarbonyl chloride, bis(2-morpholinoethyl)-9-oxofluorene-2,5-dicarboxylate dihydrochloride is obtained.

EXAMPLE 7

Bis(2-morpholinoethyl)-9-oxofluorene-2,7-dicarbothiolate dihydrochloride

When in the procedure of Example 4, 3-morpholinopropanethiol is substituted for 3-morpholino-1-propanol, bis(2-morpholinoethyl)-9-oxofluorene-2,7-dicarbothiolate dihydrochloride is obtained.

EXAMPLE 8

Bis(2-morpholinoethyl)fluorene-2,7-dicarboxylate dihydrochloride

A solution of 18.2 g (0.032 mole) of bis(2-morpholinoethyl)-9-oxofluorene-2,7-dicarboxylate dihydrochloride in water to make a total volume of 240 ml, is hydrogenated over 8.0 g of 10 percent palladium on charcoal for 2 days at 53°C on a Parr hydrogenation apparatus. The reaction mixture is decanted from the catalyst, filtered through filter aid, treated with charcoal and filtered again. This solution is made basic to phenolphthalein with 20 percent NaOH and extracted with CHCl$_3$. The combined extracts were washed with water, dried over anhydrous Na$_2$SO$_4$, filtered and the filtrate made basic to Congo Red with ethereal HCl. Most of the solvent is removed on the steam bath under vacuum, and the resulting solid is recrystallized from methanol-ether and from absolute ethanol to give bis(-2-morpholinoethyl)fluorene-2,7-dicarboxylate dihydrochloride.

EXAMPLE 9

Bis(2-morpholinoethyl) 9-hydroxyfluorene-2,5-dicarboxylate dihydrochloride hydrate A solution of 11.3 g (0.020 mole) of bis(2-morpholinoethyl)-9-oxofluorene-2,5-dicarboxylate dihydrochloride in 350 ml of warm water is cooled to room temperature and added to 3 g (0.079 mole) of NaBH$_4$ in 15 ml of water with swirling. The resulting product is extracted 5 times with ether, and the combined ether extracts are washed with water, then with NaCl solution, and dried over anhydrous MgSO$_4$. The mixture is filtered, the filtrate treated with ethereal HCl and most of the solvent distilled off. The residue is dissolved in 50 ml of hot ethanol, filtered through filter aid and the filtrate refrigerated. The crystallized solid is filtered off and is recrystallized twice from ethanol to give bis(2-morpholinoethyl) 9-hydroxyfluorene-2,5-dicarboxylate dihydrochloride hydrate.

EXAMPLE 10

Bis(3-morpholinopropyl)dibenzofuran-2,8-dicarboxylate dihydrochloride monohydrate A solution of 12.8 g (0.044 mole) of dibenzofuran2,8-dicarbonyl chloride and 12.7 g (0.088 mole) of 3-morpholino-1-propanol in 1 liter of chloroform is refluxed for 4 hours. Upon dilution with diethyl ether, the product is collected and recrystallized from ethanol to give bis(3-morpholinoethyl)dibenzofuran-2,8-dicarboxylate dihydrochloride monohydrate.

EXAMPLE 11

Bis(5-morpholinopentyl)dibenzofuran-2,8-dicarboxylate dihydrochloride

When in the procedure of Example 10, 5-morpholino-1-pentanol is used in place of 3-morpholino-1-propanol, bis(5-morpholinopentyl)dibenzofuran-2,8-dicarboxylate dihydrochloride is obtained.

EXAMPLE 12

Bis(3-piperidinobutyl)dibenzothiophene-2,6- (and 2,8)-dicarboxylate dihydrochloride monohydrate A solution of 12.0 g (0.038 mole) of a mixture of dibenzothiophene-2,6- and 2,8-dicarbonyl chloride, prepared from thionyl chloride and dibenzothiophene-2,6- and 2,8-dicarboxylic acid, and 11.4 g (0.08 mole) of 4-morpholinobutanol in 500 ml of chloroform is heated at reflux for 24 hours. The solid which separates is treated with 25 percent aqueous sodium carbonate and the free base which results is extracted with ether, dried over anhydrous magnesium sulfate and is treated with ethereal hydrogen chloride. The dihydrochloride salt is recrystallized several times from methanol-ethyl acetate to yield bis(3-piperidinobutyl)dibenzothiophene-2,6- (and 2,8)-dicarboxylate dihydrochloride monohydrate consisting of approximately 75 percent of the 2,6-isomer and 25 percent of the 2,8-isomer.

EXAMPLE 13

Dibenzothiophene-2,6- (and 2,8)-dicarboxylic acid

To 800 ml of carbon disulfide cooled to −10°C is added 56 g (0.042 mole) of aluminum chloride and 36.8 g (0.2 mole) of dibenzothiophene. To this mixture is added, with stirring, 101 g (0.8 mole) of oxalyl chloride dissolved in 100 ml of carbon disulfide and the resulting brown mixture is stirred at −10°C for 4 hours and at 28°C for 64 hours. The mixture is decomposed with cold dilute hydrochloric acid and after removal of carbon disulfide, the product is filtered and purified by extraction with dilute sodium hydroxide, filtration of the alkaline solution and conversion back to acid. The product does not melt below 320°C.

EXAMPLE 14

Bis(3-piperidinobutyl)dibenzothiophene-2,6- (and 2,8)-dicarbothiolate dihydrochloride monohydrate When in the procedure of Example 12, 3-morpholinopropanethiol is substituted for 4-morpholino, bis(3-piperidinobutyl)dibenzothiophene-2,6- (and 2,8)-dicarbothiolate hydrochloride monohydrate is obtained as a mixture.

EXAMPLE 15

Bis(3-morpholinopropyl)carbazole-3,6-dicarboxylate dihydrochloride hemihydrate

To 250 ml of isopropanol is added 11.4 g (0.07 mole) of 3-morpholinopropylchloride and 8.8 g (0.035 mole) of carbazole-3,6-dicarboxylic acid. The mixture is heated at reflux for two hours. On cooling, the product crystallizes and is collected by filtration, washed with ether, dried and dissolved in water. The aqueous solution is made basic with saturated sodium bicarbonate and the product is extracted with ether. The ether solution is washed with water, dried, and made acidic with ethereal hydrogen chloride. The solid product is crystallized from methanol-butanone to give bis(3-morpholinopropyl)carbazole-3,6-dicarboxlate dihydrochloride hemihydrate.

EXAMPLE 16

Bis(2-morpholinoethyl)-9-oxoanthene-2,7-dicarboxylate dihydrochloride

To 14.2 g (0.05 mole) of xanthone-2,7-dicarboxylic acid is added 150 ml (2.1 moles) of thionyl chloride and 100 ml of dry tetrahydrofuran. The resulting solution is refluxed for three hours and then the solvent and excess thionyl chloride are removed at reduced pressure on a steam bath. The residue is dissolved in 500 ml of dry methylene chloride, treated with activated charcoal and filtered. To the filtrate, containing xanthone-2,7-dicarboxylic acid chloride, is added 17 g (0.13 mole) of 2-morpholinoethanol. The resulting mixture is refluxed for 1.5 hours and let stand for three days. The solvent is removed and the residue dissolved in dilute hydrochloric acid and washed with methylene chloride. The aqueous layer is made basic with 15 percent sodium carbonate solution and extracted with methylene chloride. This solution is washed with dilute sodium carbonate solution and water and then dried over anhydrous magnesium sulfate. Upon filtering, the solvent is removed under reduced pressure, and the residue is dissolved in isopropyl alcohol and converted to the dihydrochloride with ethanolic-HCl. The product is precipitated with diethyl ether, filtered and purified from isopropyl alcohol-methanol to give bis(2-morpholinoethyl)-9-oxoxanthene-2,7-dicarboxylate dihydrochloride.

EXAMPLE 17

Bis(3-morpholinopropyl)xanthene-2,7-dicarboxylate dihydrochloride

When in the procedure of Example 16, xanthene-2,7-dicarboxylic acid is substituted for xanthone-2,7-dicarboxylic acid, and 3-morpholinopropanol is substituted for 2-morpholinoethanol, bis(3-morpholinopropyl)xanthene-2,7-dicarboxylate dihydrochloride is obtained.

EXAMPLE 18

3,9-Bis(2-morpholinoethoxy)fluoranthene dihydrochloride

To 450 ml of chlorobenzene is added 10.6 g (0.033 mole) of fluoranthene-3,9-diol diacetate, 12.4 g (0.066 mole) of 2-morpholinoethylchloride hydrochloride and 7.2 g (0.132 mole) of sodium methoxide, and the mixture is stirred at reflux for 24 hours then cooled and filtered. The filtrate is washed with several portions of water and dried over anhydrous magnesium sulfate.

The chlorobenzene solution is evaporated in vacuo, and the oily residue is dissolved in ether and treated with ethereal hydrogen chloride to give 3,9-bis(2-morpholinoethoxy)fluoranthene dihydrochloride which is recrystallized from methanolacetone, M.P. 284°–286°C (dec.)

EXAMPLE 19

3,9-Bis[2-(morpholino)-1-methylethoxy]-fluoranthene

When in the procedure of Example 18, 2-morpholino-1-methylethyl chloride hydrochloride is used in place of 2-morpholinoethyl chloride hydrochloride, 3,9-bis[2-(morpholino)-1-methylethoxy]fluoranthene is obtained.

EXAMPLE 20

3,9-Bis(2-morpholinoethylthio)fluoranthene dihydrochloride

When in the procedure of Example 18, fluoranthene-3,9-dithiol is used in place of fluoranthene-3,9-diol diacetate, 3,9-bis(2-morpholinoethylthio)fluoranthene dihydrochloride is obtained.

EXAMPLE 21

2,7-Bis(2-morpholinoethoxy)fluoren-9-one dihydrochloride

A mixture of 63.6 g (0.30 mole) of 2,7-dihydroxyfluoren-9-one, 176.0 g (0.95 mole) of 2-morpholinoethyl chloride hydrochloride and 132 g (2.0 moles) of 85 percent potassium hydroxide in 900 ml of toluene and 300 ml of water is refluxed with vigorous stirring for 20 hours. Upon cooling, the layers are separated. The toluene layer is washed three times with water, then once with a saturated sodium chloride solution and dried over anhydrous magnesium sulfate. The mixture is filtered and the solvent removed in vacuo. The residue is taken up in isopropyl alcohol and acidified to Congo Red with ethereal hydrogen chloride. The solid which precipitates is filtered, recrystallized from a mixture of three parts isopropyl alcohol to one part methanol, and the product dried at 100°C for 24 hours under vacuum to give 2,7-bis(2-morpholinoethoxy)fluoren-9-one dihydrochloride, M.P. 291°–293°C.

EXAMPLE 22

2,7-Bis(2-morpholinoethoxy)fluorene dihydrochloride

A solution of 2-morpholinoethyl chloride [obtained from 13.9 g (0.075 mole) of 2-morpholinoethyl chloride hydrochloride] in 100 ml of toluene (dried over molecular sieves) is added to a mixture of 4.9 g (0.025 mole) of 2,7-dihydroxyfluorene and 2.7 g (0.05 mole) of sodium methoxide in 200 ml of toluene (dried over molecular sieves). This mixture is refluxed with stirring for three hours. Upon cooling, the mixture is filtered to remove the precipitated sodium chloride. The toluene solution is washed three times with water, then once with a saturated sodium chloride solution and dried over anhydrous magnesium sulfate. This mixture is filtered and the filtrate acidified to Congo Red with ethereal hydrogen chloride. The solid which precipitates is filtered, dissolved in butanone with enough methanol added to effect solution, decolorized with charcoal, and the 2,7-bis(2-morpholinoethoxy)fluorene dihydrochloride obtained dried at 80°C under vacuum.

EXAMPLE 23

2,8-Bis(3-morpholinopropoxy)dibenzofuran dihydrochloride

To 400 ml of chlorobenzene are added 14.2 g (0.05 mole of dibenzofuran-2,8-diol diacetate, 10.8 (0.2 mole) of sodium methoxide and 20 g (0.1 mole) of 3-morpholinopropyl chloride hydrochloride. The mixture is heated to reflux with stirring for 24 hours, then cooled and filtered. The filtrate is washed with several portions of water and dried over magnesium sulfate. The chlorobenzene solution is evaporated in vacuo leaving an oily residue which is dissolved in ether and treated with ethereal HCl to give the dihydrochloride salt of 2,8-bis(3-morpholinopropoxy)dibenzofuran which is recrystallized from methanolethyl acetate.

EXAMPLE 24

2,6-Bis(3-morpholinopropylthio)dibenzofuran dihydrochloride

When in the procedure of Example 23, dibenzofuran-2,6-dithiol diacetate is substituted for dibenzofuran-2,8-diacetate, 2,6-bis(3-morpholinopropylthio)-dibenzofuran dihydrochloride is obtained.

EXAMPLE 25

N-Ethyl-3,6-carbazolediol diacetate

To a solution of 104 g (0.37 mole) of 3,6-diacetylN-ethylcarbazole in 1,700 ml of chloroform (hydrocarbon stabilized) previously cooled to 15°C is added 138 g (0.8 mole) of m-chloroperbenzoic acid. The reaction is stirred at room temperature for 4 days, then filtered. The filtrate is washed with saturated sodium bicarbonate solution and with water, then dried over anhydrous magnesium sulfate and evaporated to dryness in vacuo leaving a solid which is recrystallized from acetone-water and then from acetone methanol to give N-ethyl-3,6-carbazolediol diacetate, M.P. 138°–139°C.

EXAMPLE 26

N-Ethyl-3,6-bis(4-morpholinobutoxy)carbazole dihydrochloride

When in the procedure of Example 23, N-ethyl-3,6-carbazolediol diacetate is substituted for dibenzofuran2,8-diol diacetate, and 4-morpholinobutyl chloride hydrochloride is substituted for 3-morpholinopropyl chloride hydrochloride, N-ethyl-3,6-bis(4-morpholinobutoxy)carbazole dihydrochloride is obtained.

EXAMPLE 27

3,6-Bis(2-morpholinoethoxy)xanthen-9-one

To 54.5 g (0.239 mole) of 3,6-dihydroxyxanthen-9-one is added 240 ml of methanol and 29.0 g (0.717 mole) of sodium methoxide with stirring after which 700 ml of chlorobenzene is added. Methanol is distilled off until the reaction temperature reaches 130°C. After cooling the reaction mixture to less than about 100°C., 84.2 g (0.590 mole) of 2-morpholinoethyl chloride is added and the reaction mixture refluxed for 4 ½ hours followed by the addition of 600 ml of water and 20 ml of 50 percent NaOH with stirring continued for one-half hour. The mixture is cooled and chloroform is added to completely dissolve the product. The chlorobenzene-chloroform layer is separated and the aqueous layer is extracted into chloroform. The combined organic layers are washed with water, dried over anhydrous magnesium sulfate and evaporated to give a dark brown oil which solidifies upon cooling. The solid is dissolved in boiling ethanol, precipitated with water, cooled and filtered. The resulting solid is dried in vacuo and recrystallized from hexane to give 3,6-bis(2-morpholinoethoxy)xanthen-9-one, M.P. 153.5°–154.5°C.

EXAMPLE 28

2,7-Bis(2-morpholinoethoxy)xanthene

To 20 g (0.0935 mole) of 2,7-dihydroxyxanthene in 350 ml of chlorobenzene are added 16.5 g (0.3 mole) of sodium methoxide and 60 ml of methanol. The reaction mixture is stirred and heated during which time the methanol is removed by distillation. The mixture is cooled and 38.8 g (0.26 mole) of 2-morpholinoethyl chloride is added. After refluxing with stirring for 4 hours the mixture is cooled and 100 ml of water plus 10 ml of 50 percent NaOH solution are added. The mixture is stirred for 15 minutes, and 100 ml chloroform is added. The organic layer which separates is washed with 5 percent NaOH solution, then with water, dried over anhydrous magnesium sulfate, filtered and concentrated to a solid residue which is recrystallized from hexane to give 2,7-bis(2-morpholinoethoxy)xanthene.

EXAMPLE 29

2,6-Bis(2-morpholinoethoxy)anthraquinone dihydrochloride

To a mixture of 36 g (0.15 mole) of 2,6-dihydroxyanthraquinone and 400 ml of toluene is added 100 g (0.54 mole) of N-(2-chloroethylmorpholine)hydrochloride in 100 ml of water. With efficient stirring, a solution of 66 g (1.0 mole) of potassium hydroxide pellets (85 percent) in 350 ml of water is added. The resulting mixture is heated with continued stirring on a steam bath for about 24 hours, then cooled by adding about 500 g of ice. 400 ml chloroform is added. The lower organic layer is separated and washed several times with water, then dried with anhydrous magnesium sulfate. After filtration, the solvents are removed under reduced pressure in a rotary evaporator. The residue is recrystallized from isopropyl alcohol and water to effect solution to give 2,6-bis(2-morpholinoethoxy)anthraquinone dihydrochloride, M.P. 288°–290°C.

EXAMPLE 30

2,7-Bis(2-morpholinoethylthio)anthraquinone dihydrochloride

When in the procedure of Example 29, 2,7-dithiolanthraquinone is substituted for 2,6-dihydroxyanthraquinone, 2,7-bis(2-morpholinoethylthio)anthraquinone dihydrochloride is obtained.

EXAMPLE 31

2,8-Bis(3-morpholinopropoxy)dibenzothiophene dihydrochloride

To 200 ml of water containing 12.0 g (0.3 mole) of sodium hydroxide and 8.5 g (0.039 mole) of 2,8-dihydroxydibenzothiophene are added 200 ml of toluene and 20 g (0.1 mole) of 3-morpholinopropyl chloride hydrochloride, and the heterogeneous reaction mixture is stirred and heated to reflux for 16 hours. After cooling, the organic layer is washed with water, dried over magnesium sulfate, and concentrated in vacuo. The free base is chromatographed on alumina, using chloroform as the eluant. After removing the chloroform from the fraction collected, the oily residue is dissolved in ether and treated with ethereal hydrogen chloride to give 2,8-bis(3-morpholinopropoxy)dibenzothiophene dihydrochloride which is purified by recrystallization from methanol-butanone.

EXAMPLE 32

3,9-Bis(4-morpholinobutyryl)fluoranthene dihydrochloride

A solution of 20.6 g (0.05 mole) of 3,9-bis(4-chlorobutyryl)fluoranthene, prepared from 4-chlorobutyryl chloride and fluoranthene, M.P. 124°–127°C, 34.4 g (0.4 mole) of morpholine, 16.6 g of potassium iodide and 200 ml of butanone is refluxed with stirring for 24 hours then poured into water. The organic layer which separates is washed with a water-saturated sodium chloride solution, dried over magnesium sulfate, filtered and the filtrate acidified with ethereal HCl. The solid which precipitates is recrystallized from methanol-butanone to yield 3,9-bis-(4-morpholinobutyryl)fluoranthene dihydrochloride, M.P. 188°–191°C.

EXAMPLE 33

3,9-Bis(2-morpholinoacetyl)fluoranthene dihydrochloride

When in Example 32, 3,9-bis(2-chloroacetyl)fluoranthene, M.P. 231°–233°C, prepared from chloroacetyl chloride and fluoranthene is substituted for 3,9-bis(4-chlorobutyryl)fluoranthene, 3,9-bis(2-morpholinoacetyl)-fluoranthene dihydrochloride is obtained.

EXAMPLE 34

2,7-Bis(4-morpholinobutyryl)fluorene

A mixture of 18.8 g (0.05 mole) of 2,7-bis(4-chlorobutyryl)fluorene, 34.9 g (0.4 mole) of morpholine, 16.6 g (0.1 mole) of potassium iodide in 200 ml of butanone is stirred and refluxed for 3 days. The reaction mixture is poured into 1000 ml of water, and the solid which precipitates is filtered and recrystallized from chloroformacetone to give 2,7-bis(4-morpholinobutyryl)fluorene, M.P. 166.5°–168.5°C.

EXAMPLE 35

2,7-Bis(5-morpholinovaleryl)fluorene

When in the procedure of Example 34, 2,7-bis(5-chlorovaleryl)fluorene, prepared from fluorene and 5-chlorovaleryl chloride, is substituted for 2,7-bis(4-chlorobutyryl)fluorene, and the precipitate is recrystallized from methylene chloride methanol, 2,7-bis(5-morpholinovaleryl)fluorene is obtained, M.P. 134°–136.5°C.

EXAMPLE 36

2,7-Bis(5-morpholinovaleryl)fluoren-9-one

A solution of 12.0 g (0.025 mole) of 2,7-bis(5-morpholinovaleryl)fluorene, 2.0 ml 40 percent benzyltrimethylammonium hydroxide in pyridine and 200 ml pyridine is stirred at room temperature while oxygen is bubbled through the solution at a rate of 500 ml/min. for a total of four hours. The reaction mixture is evaporated to dryness leaving a residue which is chromatographed on alumina using chloroform as the eluant. The solvent is removed from the fraction collected leaving a solid which is recrystallized from chloroform-petroleum ether to yield 2,7-bis(5-morpholinovaleryl)-fluoren-9-one, M.P. 145.5°–147.5°C.

EXAMPLE 37

2,7-Bis(4-morpholinobutyryl)fluoren-9-one

When in the procedure of Example 36, 2,7-bis(4-morpholinobutyryl)fluorene is substituted for 2,7-bis(5-morpholinovaleryl)fluorene, 2,7-bis(4-morpholinobutyryl)-fluoren-9-one is obtained, M.P. 174°–175.5°C.

EXAMPLE 38

2,7-Bis(2-morpholinoacetyl)fluorene

When in the procedure of Example 35, 2,7-bis(2-chloroacetyl)fluorene, prepared from fluorene and 2-chloroacetyl chloride, is substituted for 2,7-bis(5-chlorovaleryl)fluorene, 2,7-bis(2-morpholinoacetyl)fluorene is obtained.

EXAMPLE 39

2,8-Bis(4-morpholinobutyryl)dibenzothiophene dihydrochloride

A solution of 20 g (0.05 mole) of 2,8-bis(4-chlorobutyryl)dibenzothiophene, 32 g (0.32 mole) of morpholine and 2.0 g of potassium iodide in 500 ml of p-dioxane is refluxed for 72 hours after which the reaction mixture is cooled and filtered. The filtrate is concentrated to one-half of its original volume and diluted with 700 ml of water to give a semi-solid which is washed with water and dissolved in methylene chloride. The methylene chloride solution is washed with water, dried over magnesium sulfate and treated with ethereal HCl to give 2,8-bis(4-morpholinobutyryl)dibenzothiophene dihydrochloride which is recrystallized from methanol-ethyl acetate, M.P. 241°–242°C.

EXAMPLE 40

2,8-Bis(5-morpholino-3-methylvaleryl)dibenzofuran dihydrochloride

When in the procedure of Example 38, 2,8-bis(5-chloro3-methylvaleryl)dibenzothiophene is substituted for 2,8-bis(4-chlorobutyryl)dibenzothiophene, 2,8-bis(5-morpholino3-methylvaleryl)dibenzofuran dihydrochloride is obtained.

EXAMPLE 41

2,8-Bis(4-morpholinobutyryl)dibenzofuran

A mixture of 17.0 g (0.045 mole) of 2,8-bis(4-chlorobutyryl)dibenzofuran, 58.4 g (0.8 mole) of morpholine and 2.0 g of potassium iodide in 500 ml of butanone is heated at reflux for 72 hours then filtered. The filtrate is concentrated to one-half its original volume then diluted with 600 ml of water. The resulting semisolid is purified by chromatography on neutral alumina using methylenechloride as the eluant. The solvent is removed from the fraction collected leaving a solid residue which is recrystallized from pentane to give 2,8-bis(4-morpholinobutyryl)dibenzofuran, M.P. 98°–99°C.

EXAMPLE 42

3,6-Bis(4-morpholinobutyryl)carbazole

A solution of 15.0 g (0.04 mole) of 3,6-bis(4-chlorobutyryl)carbazole, 86.0 g (1.0 mole) of morpholine and 2.0 g of potassium iodide in 15 ml of tetrahydrofuran is heated at 110°C in a reaction bomb for 24 hours with stirring. Upon cooling the reaction mixture is filtered and diluted with 700 ml of ice water. The resulting solid is washed with water, dried over magnesium sulfate and recrystallized from chloroform-petroleum ether (75°–90°C) and then from acetone to give 3,6-bis(4-morpholinobutyryl)-carbazole.

EXAMPLE 43

2,7-Bis(4-morpholinobutyryl)xanthene

A mixture of 43.2 g (0.08 mole) 2,7-bis(4-chloro-1,1-diethoxybutyl)xanthene, 2 g of potassium iodide, 100 ml of morpholine and 100 ml tetrahydrofuran is heated for 24 hours with stirring in a Parr bomb at 110°C. After cooling, the mixture is filtered and the filtrate is evaporated to dryness. The residue is cooled, dissolved in 300 ml of 10 percent HCl and refluxed for 1 hour. The solution is cooled, filtered, the filtrate made alkaline, and extracted with chloroform. The chloroform extract is evaporated to dryness and the residue is recrystallized twice from a 1:4 mixture of benzene in heptane. Upon drying under vacuum 2,7-bis(4-morpholinobutyryl)xanthene is obtained, M.P. 110°–111.5°C.

EXAMPLE 44

2,7-Bis(2-morpholinoacetyl)xanthene dihydrochloride hydrate

A mixture of 22.7 g (0.068 mole) of 2,7-bis(chloroacetyl)xanthene, 2 g of potassium iodide, 200 ml of morpholine and 500 ml of tetrahydrofuran is allowed to stand for 7 days at room temperature, then filtered. The filtrate is evaporated to dryness and the resulting residue is cooled, dissolved in dilute HCl and filtered. The filtrate is made alkaline and the product is extracted with methylene chloride. The methylene chloride extract is evaporated to a small volume, cooled and acidified to Congo Red with ethereal HCl. The precipitate is filtered off and recrystallized three times from methanol-diethyl ether. After drying in vacuo and hydrating in a constant humidity chamber, 2,7-bis(2-morpholinoacetyl)xanthene dihydrochloride hydrate is obtained, M.P. > 350°C.

EXAMPLE 45

2,7-Bis(4-morpholinobutyryl)xanthen-9-one

To a solution of 9.8 g (0.025 mole) of 2,7-bis(4-morpholinobutyryl)xanthene in 300 ml of glacial acetic acid is added 9.8 g (0.033 mole) of sodium dichromate over one-half hour. The mixture is stirred for 1 ½ hours, refluxed for 1 hour, then evaporated to near dryness, cooled, diluted with water and made alkaline with 28 percent NH$_4$OH solution. The resulting solid is extracted with methylene chloride, chromatographed on alumina using methylene chloride as the eluant, recrystallized from heptane and dried under vacuum at 60°C to give 2,7-bis(4-morpholinobutyryl)xanthen-9-one.

EXAMPLE 46

2,7-Bis(4-morpholinobutyryl)thioxanthene

A mixture of 44.4 g (0.08 mole) of 2,7-bis(4-chloro-1,1-diethoxybutyryl)thioxanthene, 2 g of potassium iodide, 100 ml of morpholine and 100 ml of tetrahydrofuran is heated with stirring for 24 hours in a Parr bomb. Upon cooling the solution is filtered, and the filtrate is evaporated to dryness. The residue is treated with 200 ml of 5 percent hydrogen chloride, refluxed for one hour and filtered. The filtrate is made alkaline with 20 percent NaOH solution, extracted with methylene chloride and filtered. The resulting solid is chromatographed on a column of silica gel using benzene-hexane as the eluant, recrystallized several times from benzene-heptane and acetone and dried in vacuo to give 2,7-bis(4-morpholinobutyryl)thioxanthene, M.P. 90.5°–91.5°C.

EXAMPLE 47

2,8-Bis(5-morpholinovaleryl)phenoxathiin

A mixture of 35 g (0.08 mole) 2,8-bis(5-chlorovaleryl)phenoxathiin, 2 g potassium iodide, 100 ml morpholine and 100 ml tetrahydrofuran is heated for 24 hours with stirring in a Paar bomb at 110°C. After cooling the mixture is filtered and washed with tetrahydrofuran and the filtrate evaporated to dryness. The residue is cooled and diluted with water. The mixture is extracted twice with ether and the ether extracts are combined and filtered. The filtrate is evaporated to dryness, cooled, and diluted with pentane followed by filtering off of the solid, washing with pentane and drying. The residue is recrystallized from isopropyl alcohol to yield 2,8-bis(5-morpholinovaleryl)phenoxathiin.

The following Examples are illustrative of pharmaceutical compositions containing as active ingredients compounds of general Formula I.

EXAMPLE 48

An illustrative composition for tablets is as follows:

|  | Per Tablet |
|---|---|
| (a) 2,6-bis(2-morpholinoethoxy)anthraquinone dihydrochloride | 100.0 mg |
| (b) wheat starch | 15.0 mg |
| (c) lactose | 33.5 mg |
| (d) magnesium stearate | 1.5 mg |

A portion of the wheat starch is used to make a granulated starch paste which together with the remainder of the wheat starch and the lactose is granulated, screened and mixed with the active ingredient, that is, (a), and the magnesium stearate. The mixture is compressed into tablets weighing 150 mg each.

EXAMPLE 49

An illustrative composition for a parenteral injection is the following wherein the quantities are on a weight to volume basis.

|  | Amount |
|---|---|
| (a) Bis(2-morpholinoethyl)-9-oxofluorene-2,7-dicarboxylate dihydrochloride | 100.0 mg |
| (b) sodium chloride | q.s |
| (c) water for injection to make | 10.0 ml |

The composition is prepared by dissolving the active ingredient, that is, (a), and sufficient sodium chloride in water for injection to render the solution isotonic. The composition may be dispensed in a single ampule containing 100 mg of the active ingredient for multiple dosage or in 10 ampules for single dosage.

EXAMPLE 50

An illustrative composition for hard gelatin capsules is as follows:

|  | Per Capsule |
|---|---|
| (a) 3,9-bis(2-morpholinoethoxy)fluoranthene dihydrochloride | 200.0 mg |
| (b) talc | 35.0 mg |

The composition is prepared by passing the dry powders of (a) and (b) through a fine mesh screen and mixing them well. The powder is then filled into No. 0 hard gelatin capsules at a net fill of 235 mg per capsule.

EXAMPLE 51

An illustrative composition for pills is as follows:

|  | Per Pill |
|---|---|
| (a) 3,6-bis(2-morpholinoethoxy)xanthen-9-one | 200 mg |
| (b) corn starch | 130 mg |
| (c) liquid glucose | 20 mg |

The pills are prepared by blending the active ingredient (a) and the corn starch then adding the liquid glucose with thorough kneading to form a plastic mass from which the pills are cut and formed.

I claim:

1. A method of treating conditions of delayed hypersensitivity which comprises administering to a patient in need of such treatment an effective quantity of a compound of the formula

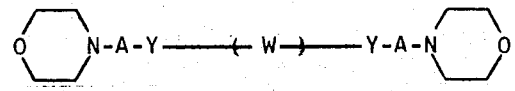

wherein (W) is an aromatic polycyclic nucleus selected from fluoranthene, fluorene, fluoren-9-ol, fluoren-9-one, dibenzofuran, dibenzothiophene, carbazole, N-(lower)alkyl carbazole, xanthene, xanthone, thioxanthene, phenoxathiin, or anthraquinone; Y is selected from carbonyloxy, carbonylthio, oxygen, divalent sulfur, or carbonyl with the provisos that when Y is carbonyloxy or carbonylthio, (W) is other than thioxanthene, phenoxathiin, or anthraquinone, when Y is oxygen or divalent sulfur, (W) is other than thioxanthene or phenoxathiin, and when Y is carbonyl, (W) is other than fluoren-9-ol or anthraquinone; A is selected from a straight or branched alkylene chain of from one to six carbon atoms with the proviso when y is carbonyloxy or carbonylthio, A contains from two to six carbon atoms; and pharmaceutically acceptable acid addition salts thereof.

2. A method of claim 1 wherein Y is carbonyloxy.
3. A method of claim 1 wherein Y is carbonylthio.
4. A method of claim 1 wherein Y is oxygen.
5. A method of claim 1 wherein Y is divalent sulfur.
6. A method of claim 1 wherein Y is carbonyl.

* * * * *

UNITED STATES PATENT AND TRADEMARK OFFICE
CERTIFICATE OF CORRECTION

PATENT NO. : 3,867,531
DATED : February 18, 1975
INVENTOR(S) : Irving Shemano

It is certified that error appears in the above-identified patent and that said Letters Patent are hereby corrected as shown below:

Column 2, line 1, "dibenzothlophene" should read "dibenzothiophene". Column 3, line 43, "(4-morpholinobutyl(fluoren" should read "(4-morpholinobutyl)fluoren"; line 45, "(2-morpholinoethyl(fluoren" should read "(2-morpholinoethyl)fluoren"; line 46, "(2-morpholinoethoxy(fluoren" should read "(2-morpholinoethoxy)fluoren". Column 10, line 29, "bis-ketalderivatave bis-ketal derivative" should read "bis-ketal derivative". Column 13, line 63, "2,5-decarboxylate acid" should read "2,5-decarboxylic acid". Column 14, line 6, "After the removal workup" should read "After the normal workup". Column 15, line 12, "bis(3-morpholinoethyl)" should read "bis(3-morpholinopropyl)"; line 47, "(0.042 mole)" should read "(0.42 mole)". Column 16, line 20, "-9-oxoanthene" should read "-9-oxoxanthene". Column 18, line 6, "10.8 (0.2 mole)" should read "10.8 g (0.2 mole)"; line 23, "2,8-diacetate" should read "2,8-diol diacetate". Column 24, line 25, "(c) liquid glucose 20 mq" should read "(c) liquid glucose 20 ml"; line 54, "when y is" should read "when Y is".

Signed and Sealed this

Twelfth Day of April 1977

[SEAL]

Attest:

RUTH C. MASON
Attesting Officer

C. MARSHALL DANN
Commissioner of Patents and Trademarks